United States Patent [19]

Randall, Jr. et al.

[11] Patent Number: 4,470,885

[45] Date of Patent: Sep. 11, 1984

[54] PROCESS FOR TREATING ALUMINUM ELECTROLYTIC CAPACITOR FOIL

[75] Inventors: John J. Randall, Jr., North Adams; Trung H. Nguyen, Williamstown, both of Mass.; Clinton E. Hutchins, Pownal, Vt.

[73] Assignee: Sprague Electric Company, North Adams, Mass.

[21] Appl. No.: 464,226

[22] Filed: Feb. 7, 1983

[51] Int. Cl.³ .............................................. C25D 5/44
[52] U.S. Cl. ................................. 204/29; 148/6.15 R; 148/6.27; 148/13; 148/127; 204/33; 204/58
[58] Field of Search ................ 148/6.27, 6.15 R, 159, 148/127, 13, 20.3; 204/42, 29, 32 R, 58, 33

[56] References Cited

U.S. PATENT DOCUMENTS

| Re. 28,015 | 5/1974 | Vermilyea et al. ............... 148/6.27 |
| 1,330,581 | 2/1920 | Coulson . | |
| 3,600,245 | 8/1971 | Gates ..................................... 156/22 |
| 3,666,642 | 5/1972 | Alwan et al. ........................ 204/141 |
| 3,945,899 | 3/1976 | Nikaido et al. ........................ 204/58 |
| 4,113,579 | 9/1978 | Randall et al. ........................ 204/42 |
| 4,204,919 | 5/1980 | Randall et al. ...................... 148/6.27 |

FOREIGN PATENT DOCUMENTS

| 779874 | 3/1968 | Canada ................................. 204/85 |
| 53-43864 | 4/1978 | Japan . |
| 57-115815 | 7/1982 | Japan . |
| 1179486 | 1/1970 | United Kingdom . |

*Primary Examiner*—Norman Morgenstern
*Assistant Examiner*—Janyce A. Bell

[57] ABSTRACT

Aluminum electrolytic capacitor foil is treated after etching but before anodizing by first contacting it with a phosphate solution and then heat treating for 30 to 90 seconds to form a thermal oxide layer of controlled thickness. On subsequent anodization, the thermal oxide layer modifies the barrier oxide layer increasing its dielectric strength and hence capacitance and also stabilizes the barrier oxide layer.

5 Claims, No Drawings

PROCESS FOR TREATING ALUMINUM ELECTROLYTIC CAPACITOR FOIL

BACKGROUND OF THE INVENTION

This invention relates to the treatment of aluminum electrolytic capacitor foil in which the foil is contacted, after etching but prior to anodizing, with a phosphate solution and then heat treated for 30–90 seconds to form a thermal oxide layer of controlled thickness. On subsequent anodization, the presence of the thermal oxide layer modifies the barrier oxide layer increasing its dielectric strength and thus the capacitance.

Thermal oxidation of aluminum foil is known to increase capacitance but also leads to instability and high leakage currents. The length of the heat treatment is critical as long times produce a poor product.

It has also been known to anneal aluminum foil prior to anodization. This heat treating is carried out at high enough temperatures and long enough times to permit at least partial recrystallization or growth in metal grain size decreasing the amount of amorphous metal or providing a better temper.

Other processes are well-known in which the foil is cleaned with acid and then heated. Generally, nitric acid is used as nitrate residues are relatively easy to remove from aluminum foil surfaces by heating the foil.

Phosphate and phosphoric acid treatment of aluminum foil to inhibit hydration of the foil is also well-known. This treatment is sometimes followed by a drying step at relatively low to moderate temperatures.

SUMMARY OF THE INVENTION

It has been found that when etched foil is contacted with a phosphate solution and then briefly heat treated, a minute amount of thermal oxide is formed which enhances or modifies the barrier layer oxide subsequently formed.

However, the formation of the thermal oxide must be carefully controlled to prevent the instability heretofore encountered. When only a small amount of thermal oxide is formed, the dielectric strength of the barrier layer oxide is improved.

The barrier layer oxide is modified in some manner so that a thinner film is produced, 10 Å/V, as compared with a conventional barrier layer of 14 Å/V. Since capacitance is inversely proportional to barrier layer thickness, a greater capacitance per unit of foil area results from the process of the present invention. As a practical result, less foil is needed for a given capacitance.

The amount of thermal oxide can be limited by passivating the foil surface, short heating times, or a combination of these. It has been found that treating etched foil with a phosphate solution followed by heat treating for 30–90 seconds is a suitable combination. The temperature is 550° to 660° C., preferably 590°–630° C. Higher temperatures will melt the aluminum and lower temperatures require too long a time although the desired crystalline oxide will form at a temperature as low as 450° C.

A soluble phosphate salt, preferably a dihydrogen phosphate is used instead of phosphoric acid as the latter attacks the foil surface, destroying the etch structure. The dihydrogen phosphate is a milder material with a pH nearer to neutral (pH of 4 vs. pH of 1 for the acid) and seems to produce a thin aluminum phosphate deposit on the foil surface which controls the thickness of the thermal oxide layer and somehow modifies it so that the subsequently formed barrier oxide layer is stabilized as well as of increased capacitance.

However, other soluble phosphates may be utilized if the pH is adjusted to a pH of 4–6. If the solution is too acidic or on the basic side, the stability of the subsequently formed barrier oxide is impaired. There may also be some attack of the foil surface. Heavy metal phosphates should be avoided as these, e.g., copper, nickel, have an adverse effect on final capacitor performance.

Whatever the mechanism, it is known that the sequence of contacting etched foil with the phosphate solution followed by the heat treatment results in the formation upon anodization of a thinner, more stable barrier layer oxide of increased dielectric strength, i.e. 10 Å/V.

DESCRIPTION OF THE PREFERRED EMBODIMENTS

Clean etched foil is treated with a phosphate solution and then heat treated at an elevated temperature, preferably 593.3° C., for 30–90 seconds, preferably 45 seconds. A soluble dihydrogen phosphate is preferred, and in the first example below, ammonium and sodium dihydrogen phosphates are compared.

Capacitance instability is shown by an increase in capacitance requiring a charge to reform the dielectric oxide. When unstable foil is used in a capacitor, the capacitor will draw a charge. Instability is detected by boiling samples in water, checking capacitance, reforming and checking capacitance again. If unstable, capacitance will rise after boiling and drop after reforming. Little change indicates stability.

EXAMPLE 1

In this example, the concentration of the sodium dihydrogen phosphate (SDP) and the ammonium dihydrogen phosphate (ADP) were 0.2M. Contacting temperature was 85° C., and contacting times were 1, 3, and 5 min. Heat treatment was carried out at 593.3° C. for 45 seconds. Except for the control sample, capacitance in $\mu F/in^2$ was measured after heat treatment ($Cap_1$), after boiling in water for 3 minutes ($Cap_2$) and after reforming to 200 V $Cap_3$). Capacitance stability was indicated by boiling in water and rechecking capacitance, and all samples showed very slight, if any, instability, i.e., little change in capacitance. Three sets were phosphate treated but not heat treated.

TABLE 1

| Sample | Sol'n | Time | $Cap_1$ | $Cap_2$ | $Cap_3$ |
|---|---|---|---|---|---|
| Control | — | — | 3.93 | 3.75 | 3.88 |
| No heat treat | SDP | 1 min. | 5.52 | 5.26 | 5.35 |
| No heat treat | SDP | 3 min. | 5.36 | 5.11 | 5.29 |
| No heat treat | SDP | 5 min. | 5.84 | 5.62 | 5.82 |
| Heat treated | SDP | 1 min. | 6.97 | 6.69 | 6.88 |
| Heat treated | SDP | 3 min. | 6.86 | 6.55 | 6.83 |
| Heat treated | SDP | 5 min. | 5.79 | 5.52 | 5.69 |
| Heat treated | ADP | 1 min. | 8.09 | 7.90 | 7.99 |
| Heat treated | ADP | 3 min. | 7.69 | 7.37 | 7.61 |
| Heat treated | ADP | 5 min. | 6.19 | 5.95 | 6.18 |

In all cases, the combined treatment improved capacitance. The ammonium salt gave better results than the sodium one and is preferred, not only on this basis but also because it is a cation frequently encountered in aluminum electrolytic capacitor electrolytes.

EXAMPLE 2

This example shows the effect of length of heat treatment time at 593.3° C. on capacitance. All samples were contacted with a 0.2M ammonium dihydrogen phosphate solution at 85° C. for 5 minutes. Capacitance is given as in Example 1, and heat treating time is in seconds.

TABLE 2

| Sample | Time | $Cap_1$ | $Cap_2$ | $Cap_3$ |
|---|---|---|---|---|
| Control | — | 6.02 | 6.04 | 6.01 |
| 1 | 30 | 8.50 | 8.42 | 8.39 |
| 2 | 60 | 8.48 | 8.26 | 8.51 |
| 3 | 90 | 8.34 | 8.13 | 8.25 |
| 4 | 120 | 9.45 | 14.40 | 7.84 |

The 120 second heat treating time resulted in unstable capacitance after heat treating and after boiling ($Cap_1$ and $Cap_2$) but stabilized after reforming. Best results were obtained at 30 and 60 seconds, and further evaluation led to the choice of 45 seconds as the preferred time.

EXAMPLE 3

This example shows the use of ammonium dihydrogen phosphate solutions of various concentrations and 1, 3 and 5 minute contacting times. All samples were heat treated at 593.3° C. for 45 seconds, anodized to 200 V ($Cap_1$), boiled in water for 3 minutes ($Cap_2$), and reformed to 200 V ($Cap_3$).

TABLE 3

| Sample | Con., M | Min. | T° C. | $Cap_1$ | $Cap_2$ | $Cap_3$ |
|---|---|---|---|---|---|---|
| 1 | 0.01 | 5 | 85 | 8.49 | 8.46 | 8.43 |
| 2 | 0.05 | 1 | 50 | 8.59 | 8.70 | 8.56 |
| 3 | 0.05 | 5 | 50 | 8.53 | 8.32 | 8.52 |
| 4 | 0.05 | 1 | 85 | 8.54 | 8.25 | 8.53 |
| 5 | 0.05 | 5 | 85 | 8.43 | 8.20 | 8.45 |
| 6 | 0.1 | 5 | 85 | 8.49 | 8.46 | 8.43 |
| 7 | 0.2 | 5 | 85 | 8.44 | 8.15 | 8.45 |
| 8 | 0.525 | 3 | 67.5 | 8.12 | 7.81 | 8.15 |
| 9 | 1.0 | 1 | 50 | 8.35 | 8.00 | 8.34 |
| 10 | 1.0 | 1 | 85 | 7.45 | 7.19 | 7.53 |

Lower concentrations of the phosphate gave better results than did higher ones. Increasing the treating time had about the same effect as increasing the temperature while using a short treatment time. At higher concentrations, the lower temperatures and shorter times appear more suitable.

What is claimed is:

1. A process for treating aluminum electrolytic capacitor foil comprising contacting said foil after etching with a solution containing 0.01 to 1.0 mole/liter of a soluble dihydrogen phosphate and having a pH of 4 to 6 and then heat treating said foil for between 30 and 90 seconds at between 590° and 630° C. to form a layer of thermal oxide of controlled thickness on said foil and then anodizing said foil producing a modified barrier layer oxide thus increasing capacitance of said foil and stabilizing said barrier layer oxide.

2. A process according to claim 1 wherein said heat treating is carried out for 45 seconds.

3. A process according to claim 1 wherein said contacting is carried out at 50° to 85° C.

4. A process according to claim 1 wherein said dihydrogen phosphate is ammonium or sodium.

5. A process according to claim 4 wherein said phosphate solution contains 0.05 mole/liter ammonium phosphate and said contacting is carried out at 50° C.

* * * * *